United States Patent
Qiao et al.

(10) Patent No.: US 11,562,065 B2
(45) Date of Patent: Jan. 24, 2023

(54) DATA BREACH DETECTION

(71) Applicant: INTERNATIONAL BUSINESS MACHINES CORPORATION, Armonk, NY (US)

(72) Inventors: Mu Qiao, Belmont, CA (US); Preethi Anantharaman, San Jose, CA (US); Eric Kevin Butler, San Jose, CA (US); Divyesh Jadav, San Jose, CA (US); Nikolaos Anerousis, Los Gatos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 665 days.

(21) Appl. No.: 16/547,905

(22) Filed: Aug. 22, 2019

(65) Prior Publication Data
US 2021/0056203 A1 Feb. 25, 2021

(51) Int. Cl.
*G06F 21/55* (2013.01)
*G06F 16/21* (2019.01)
*G06F 16/11* (2019.01)
*G06F 21/56* (2013.01)
*G06F 16/27* (2019.01)
*G06F 16/901* (2019.01)

(52) U.S. Cl.
CPC .......... *G06F 21/554* (2013.01); *G06F 16/128* (2019.01); *G06F 16/21* (2019.01); *G06F 16/27* (2019.01); *G06F 16/9027* (2019.01); *G06F 21/566* (2013.01)

(58) Field of Classification Search
CPC ...... G06F 21/554; G06F 16/128; G06F 16/21; G06F 16/27; G06F 16/9027; G06F 21/566; G06F 21/55; H04W 12/12; H04L 63/14
See application file for complete search history.

(56) References Cited

U.S. PATENT DOCUMENTS

| | | | | |
|---|---|---|---|---|
| 7,454,418 | B1 * | 11/2008 | Wang | G06F 21/564 |
| 7,483,972 | B2 * | 1/2009 | Bhattacharya | H04L 63/1416 |
| | | | | 709/224 |
| 7,885,791 | B2 * | 2/2011 | Boettcher | G06K 9/6219 |
| | | | | 702/33 |

(Continued)

OTHER PUBLICATIONS

Haque, "Analysis of Bulk Power System Resilience Using Vulnerability Graph", Diss, Old Dominion University (2018), (143 pages).

(Continued)

*Primary Examiner* — Mohammed Waliullah
(74) *Attorney, Agent, or Firm* — F. Chau & Associates, LLC

(57) ABSTRACT

Systems and methods are described for a data breach detection based on snapshot analytics. The described systems and methods identify a plurality of snapshots of a data structure, identify a plurality of leaf nodes of the data structure for each of the snapshots, generate a vector of data attributes for each of the leaf nodes, assign a weight to each of the vectors to produce a set of weighted vectors for each of the snapshots, compute a distance metric between each pair of the snapshots based on the corresponding sets of weighted vectors, and detect an abnormal snapshot among the plurality of snapshots based on the distance metrics.

16 Claims, 7 Drawing Sheets

(56) References Cited

U.S. PATENT DOCUMENTS

| | | | |
|---|---|---|---|
| 8,010,469 B2* | 8/2011 | Kapoor | H04L 63/1441 706/20 |
| 8,955,129 B2 | 2/2015 | Cao et al. | |
| 10,038,703 B2 | 7/2018 | Liu et al. | |
| 10,122,742 B1 | 11/2018 | Oprea et al. | |
| 2004/0133672 A1* | 7/2004 | Bhattacharya | H04L 63/1416 709/224 |
| 2007/0192863 A1* | 8/2007 | Kapoor | H04L 63/145 726/23 |
| 2014/0040199 A1* | 2/2014 | Golab | G06F 16/211 707/634 |
| 2014/0351217 A1* | 11/2014 | Bostock | G06F 16/128 707/639 |
| 2015/0135320 A1* | 5/2015 | Coskun | H04L 43/04 726/24 |
| 2015/0229662 A1* | 8/2015 | Hitt | H04L 63/1425 726/23 |
| 2016/0021141 A1* | 1/2016 | Liu | H04L 63/1433 726/23 |
| 2016/0028752 A1* | 1/2016 | Di Pietro | H04L 63/1416 726/23 |
| 2016/0065594 A1 | 3/2016 | Srivastava et al. | |
| 2016/0098561 A1* | 4/2016 | Keller | G06F 21/566 726/24 |
| 2019/0108341 A1* | 4/2019 | Bedhapudi | G06F 16/1752 |

OTHER PUBLICATIONS

Hariri, "DDDAS-based Resilient Cyberspace (DRCS)", No. AFRL-AFOSR-VA-TR-2016-0286, Department of Electrical and Computer Engineering, The University of Arizona Tucson United States, 2016 (54 pages).

Kush, et al. "Gap analysis of Intrusion detection in smart grids", Proceedings of the 2nd International Cyber Resilience Conference, Edith Cowan University, Perth Western Australia, Aug. 1-2, 2011), pp. 38-46.

Thebeau II, et al., "Improving cyber resiliency of cloud application services by applying Software Behavior Encryption (SBE)", Procedia Computer Science 28 (2014), pp. 62-70.

International Search Report dated Oct. 23, 2020 in corresponding PCT International Application No. PCT/EP2020/072975 (12 pages).

Kazdagli, et al., "Exploiting Latent Attack Semantics for Intelligent Malware Detection", arXiv:1708.01864v1 [cs.CR] Aug. 6, 2017, Cornell University Library, pp. 1-14.

Tan, et al., "Detection of Denial-of-Service Attacks Based on Computer Vision Techniques", IEEE Transaction on Computers, vol. 64, No. 9, Sep. 1, 2015, pp. 2519-2533.

* cited by examiner

DATA BREACH DETECTION

BACKGROUND

The following relates generally to data breach detection, and more specifically to data breach detection based on snapshot analytics.

As individuals and corporate entities become more reliant on data, they also become vulnerable to attacks that target that data. Cyber resiliency is the ability of an individual or organization to continue to function with the least amount of disruption in the face of cyber-attacks. Cyber resiliency may include information security, business continuity, and network resilience of enterprises to ensure organizations continue to function during cyber-attacks and cyber outages.

In some cases, cyber attacks may be conducted in a way that makes them hard to detect. Therefore, there is a need in the art for systems and methods that provide improved ability to detect sophisticated cyber attacks.

SUMMARY

A method, apparatus, and non-transitory computer readable medium for data breach detection based on snapshot analytics are described. The method, apparatus, and non-transitory computer readable medium may provide for identifying a plurality of snapshots of a data structure, identifying a plurality of leaf nodes of the data structure for each of the snapshots, generating a vector of data attributes for each of the leaf nodes, assigning a weight to each of the vectors to produce a set of weighted vectors for each of the snapshots, computing a distance metric between each pair of the snapshots based on the corresponding sets of weighted vectors, and detecting an abnormal snapshot among the plurality of snapshots based on the distance metrics.

DETAILED DESCRIPTION

Figure 1:
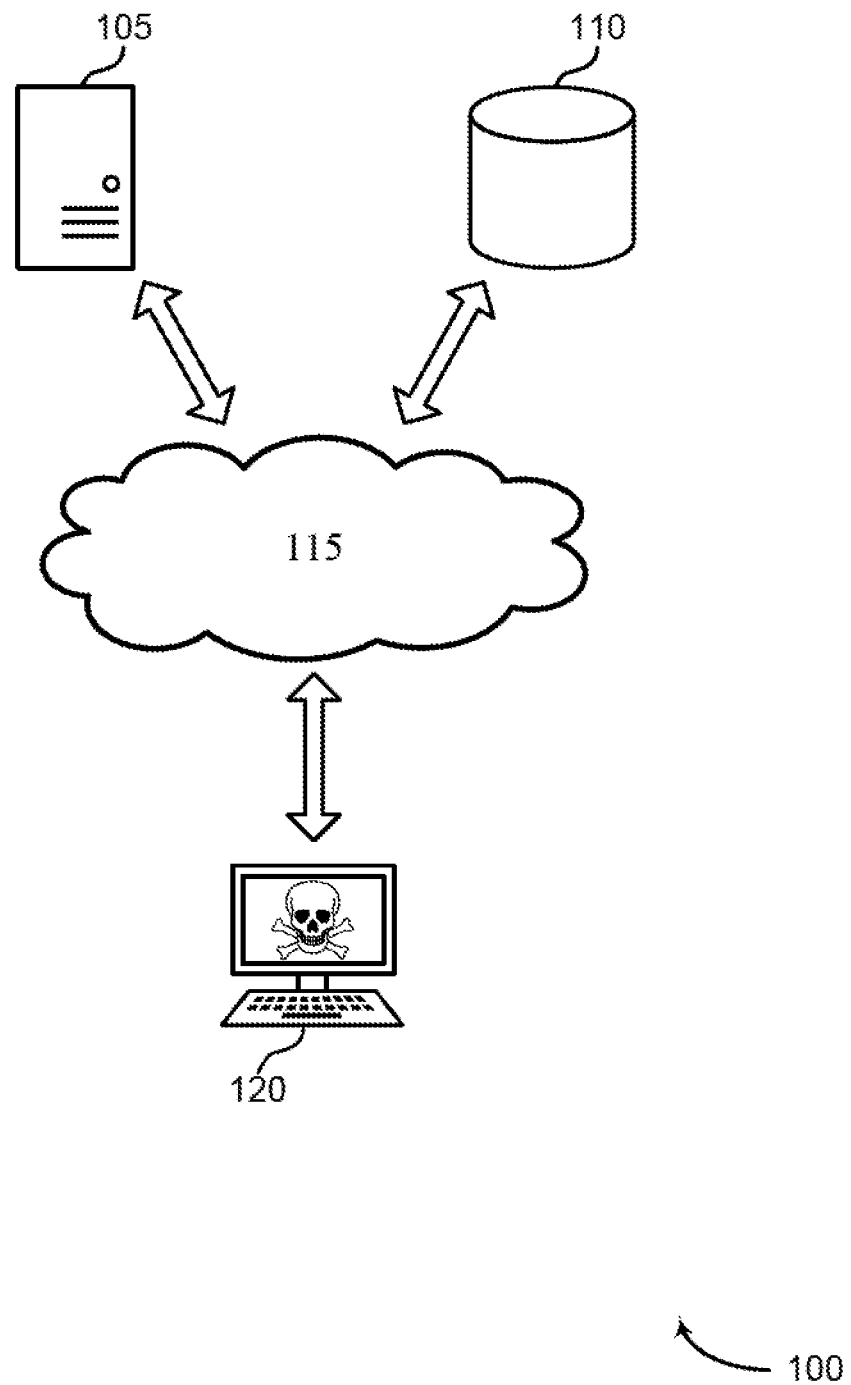
FIG. 1 shows an example of an abnormal snapshot detection system in accordance with aspects of the present disclosure.

The present disclosure provides systems and methods for data breach detection. Embodiments of the disclosure relate to a data breach detection method in which snapshots of backup files are taken and compared to the surrounding files to detect any abnormalities in the structure of the files outside normal patterns of changes.

Embodiments of the present disclosure generate a discrete distribution of file attributes in backup snapshots (i.e., the snapshot signature) using a weighted tree structure, which consists of a set of weighted vectors. Then a distance metric, measured between two sets of weighted vectors, is calculated between two snapshot signatures. An abnormal snapshot is detected by comparing the local density of a snapshot with the densities of the snapshots of neighboring data sets.

Cyber-attacks are on the rise, with phishing and social engineering, malware, spear phishing, denial of service, and out-of-date software being the top cyber disruptions threatening organizations today. Key cyber resiliency concerns include: lacking the ability to remain resilient in the wake of a cyber attach, insufficient planning and preparedness being top barriers to cyber resilience, and ad-hoc, non-existent, or inconsistent cyber security incident response plans.

With cyber-attacks becoming increasingly prevalent and costly, cyber resiliency challenges are becoming more difficult. Cyber espionage and ransomware are becoming common, with advanced, targeted, and persistent threats focused on many organizations. The attack landscape is constantly expanding with network and infrastructure becoming more complex.

Attacks such as malware corrupting backup files cause numerous issues, and recovery processes take significant time (especially when manual operations are required to resolve the issues). Additionally, a growing number of regulations impose requirements on organizations that demand costly compliance procedures. For example, data breach notification requirements contribute to the challenges in the digital world.

A variety of data breach detection methods may be used to determine whether data has been compromised. These detection methods may include techniques used to detect abnormal backup snapshots, which can suggest a cyber threat or breach of data security. For example, a number of data breach detection methods use single-vector anomaly detection methods. Density-based anomaly detection methods use vector proximity to determine statistical outliers. These methods compare the density around a point with the density around the local neighbors of that point. The methods assume the density around a normal data object has a similar density to neighboring data objects.

Clustering-based anomaly detection methods arrange similar objects into groups. These methods assume that anomalous instances either lie in sparse areas, small clusters, far from the center of main clusters, or that they are not assigned to a cluster at all. Support vector machine based anomaly detection methods can provide a non-linear classification of data through a kernel function.

However, in many cases, the assumptions of these detection methods may not apply to sophisticated hacking attempts that make complex changes to data. Therefore, the present disclosure provides systems and methods for detecting a data breech that is capable of detecting sophisticated hacking attempts.

FIG. 1 shows an example of an abnormal snapshot detection system 100 in accordance with aspects of the present disclosure. The example shown includes server 105, database 110, network 115, and attacker terminal 120.

Server 100 may communicate with database 110 via network 115 to provide a data breach detection service. For example, server 100 may take periodic snapshots of database 110 in order to detect abnormal changes in the data. If the attacker terminal 120 gains access to the database (e.g., via network 115), it may change some of the data in the database 110. Then one of the backup snapshots taken by server 100 may be recognized as abnormal and a response my be initiated to mitigate the effects of the attack.

Figure 2:
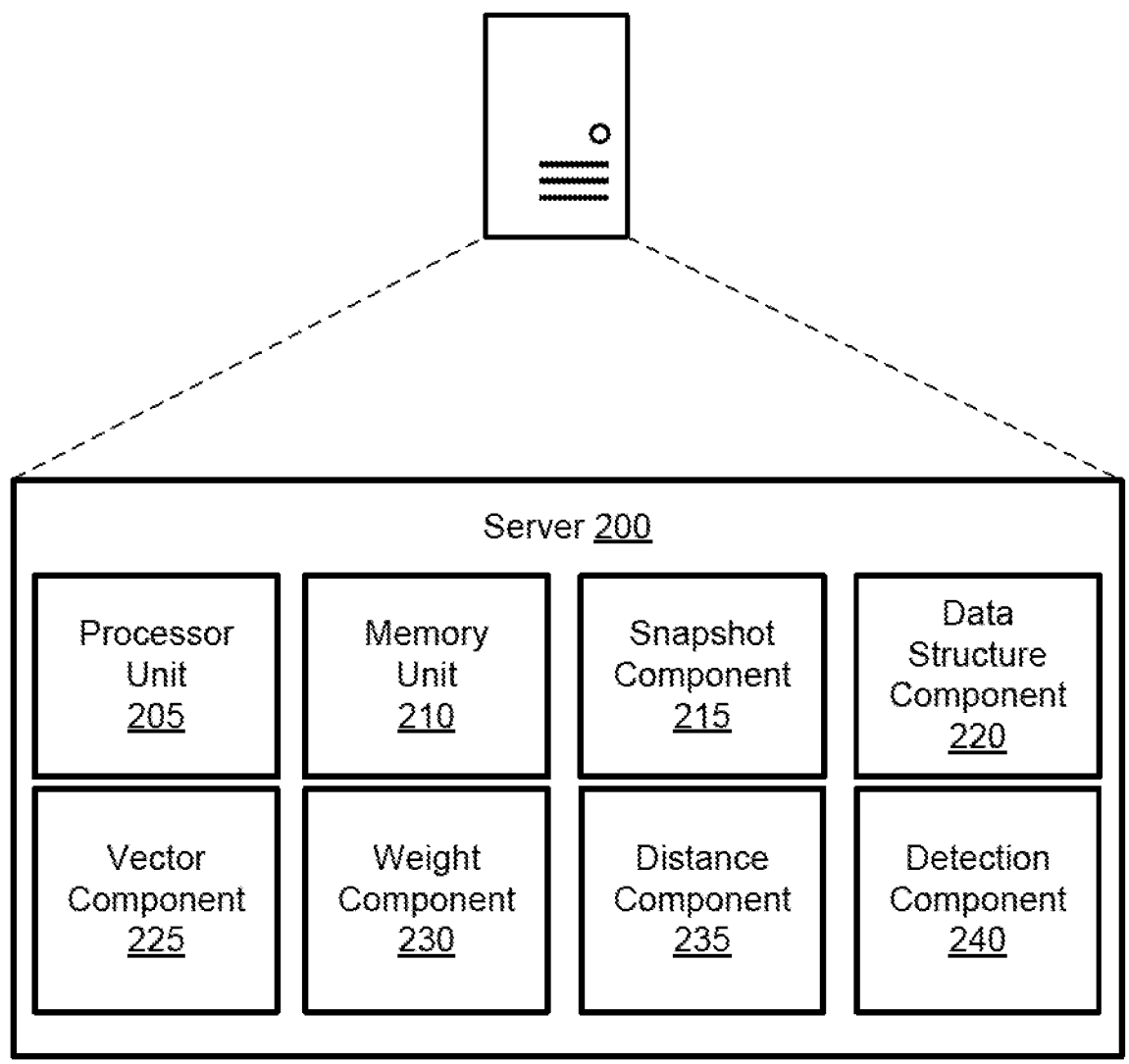
FIG. 2 shows an example of a server in accordance with aspects of the present disclosure.

FIG. 2 shows an example of a server 200 in accordance with aspects of the present disclosure. Server 200 may be an example of, or include aspects of, the corresponding element or elements described with reference to FIG. 1. Server 200 may include processor unit 205, memory unit 210, snapshot component 215, data structure component 220, vector component 225, weight component 230, distance component 235, and detection component 240.

A processor unit 205 may include an intelligent hardware device, (e.g., a general-purpose processing component, a digital signal processor (DSP), a central processing unit (CPU), a graphics processing unit (CPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into processor. The processor may be configured to execute computer-readable instructions stored in a memory to perform various functions.

A memory unit 210 may store information for various programs and applications on a computing device. For example, the storage may include data for running an operating system. The memory may include both volatile memory and non-volatile memory. Volatile memory may random access memory (RAM), and non-volatile memory may include read-only memory (ROM), flash memory, electrically erasable programmable read-only memory (EEPROM), digital tape, a hard disk drive (HDD), and a solid state drive (SSD).

Snapshot component 215 may identify a set of snapshots of a data structure. In some examples, each of the set of snapshots corresponds to a backup of the data structure at a different point in time.

Data structure component 220 may identify a data structure of each snapshot, including a set of leaf nodes. For example, data structure component 220 may identify a tree structure where the leaf nodes of the data structure correspond to a bottom level of the tree structure. In some examples, the tree structure corresponds to a file directory of the data structure.

Vector component 225 may generate a vector of data attributes for each of the leaf nodes. In some examples, each of the vectors includes values corresponding to a path depth attribute, a file size, a file count, a file extension attribute, a file modification attribute, or any combination thereof.

Weight component 230 may assign a weight to each of the vectors to produce a set of weighted vectors for each of the snapshots. In some examples, the weight assigned to each of the vectors corresponds to a number of files associated with a corresponding leaf node. In some examples, the weight assigned to each of the vectors corresponds to a cybersecurity risk associated with a corresponding leaf node.

Distance component 235 may compute a distance metric between each pair of the snapshots based on the corresponding sets of weighted vectors. For example, distance component 235 may compute a set of connection weights, where each of the connection weights includes a first index corresponding to a first leaf node of a first snapshot and a second index corresponding to a second leaf node of a second snapshot, where a sum of connection weights having the first index is equal to a weight assigned to the first leaf node and a sum of connections weights having the second index is equal to a weight assigned to the second leaf node and a sum of the set of connection weights is equal to one.

The distance component 235 may then multiply each of the connection weights by a squared distance between a vector corresponding to the first leaf node and a vector corresponding to the second leaf node to produce a set of weighted distances. Distance component 235 may calculate the distance metrics based on a sum of the weighted distances, where the set of connection weights is computed to minimize the sum. In some examples, the distance metric includes an earth mover's distance, a Kantorovich-Mallows distance, a Wasserstein distance, or any combination thereof.

Detection component 240 detects an abnormal snapshot among the set of snapshots based on the distance metrics. Detection component 240 may also compute a local reachability density for each of the snapshots based on the computed distance metrics. Detection component 240 may also determine whether the local reachability density for each of the snapshots is below a threshold based on neighboring snapshots, where the abnormal snapshot is identified based on the determination.

Figure 3:
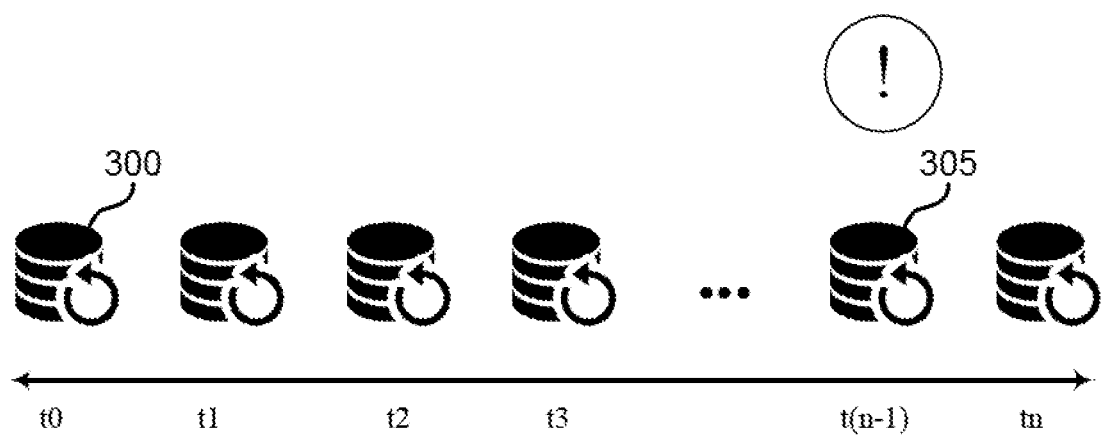
FIG. 3 shows an example of a series of snapshots in accordance with aspects of the present disclosure.

FIG. 3 shows an example of a series of snapshots 300 in accordance with aspects of the present disclosure. The example shown includes snapshots 300 and an abnormal snapshot 305. Each snapshot 300 captures the state of a database at a particular moment in time.

By comparing the different snapshots 300, it is possible to detect an abnormal snapshot 305 using the systems and methods described herein. When the abnormal snapshot 305 is detected, the system may raise an alert notifying the user that there may have been a data breach.

Figure 4:
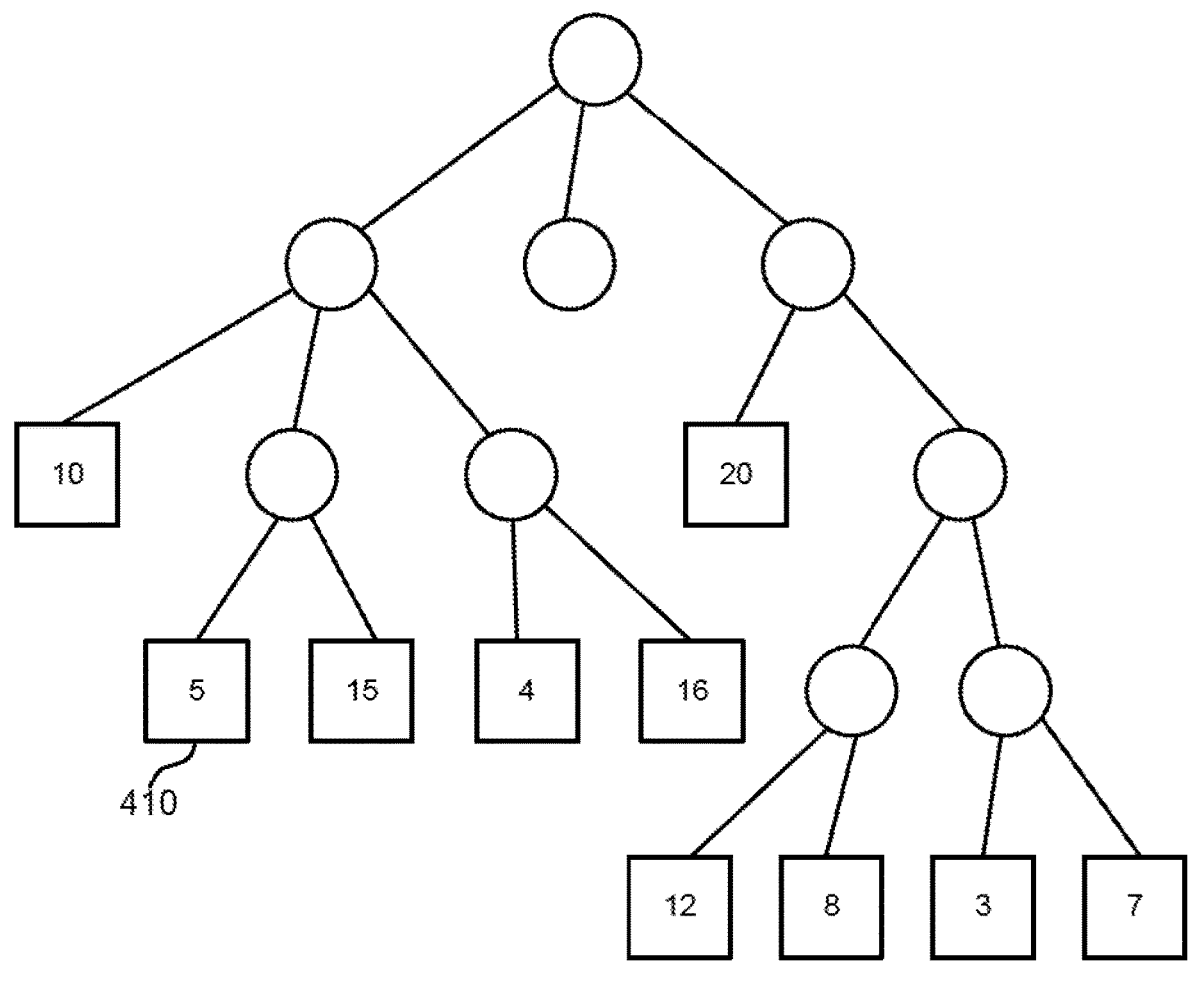
FIG. 4 shows an example of a data structure in accordance with aspects of the present disclosure.

FIG. 4 shows an example of a data structure in accordance with aspects of the present disclosure. In the example shown, the data structure corresponds to a directory tree 400, which may include one or more nodes 405 and leaf nodes 410. Each node 405 may be associated with one or more children nodes. The bottom level of the directory tree 400 includes the leaf nodes 410.

According to embodiments of the present disclosure, each leaf node may be associated with a vector that includes various attributes, such as a path depth attribute, a file size, a file count, a file extension attribute, a file modification attribute, or any combination thereof. These vectors change with each snapshot, and the combination of the vectors represents a signature of the snapshot of the data structure at a particular moment in time). By comparing the signatures for statistical abnormalities, an abnormal snapshot may be detected. Specifically, embodiments of the present disclosure describe a system for detecting an abnormal snapshot based on comparing snapshot signatures that includes multiple vectors corresponding to the leaf nodes.

Each leaf node may also be associated with a weight based on the number of files it includes (or a normalized number of files, a size of the files, or a similar value). In other examples, the leaf node 410 can be assigned weights by a user to represent the likelihood that the node will be targeted by a cyber attack. That is, certain directories may be more prone to ransomware attacks, therefore may be more heavily weighted.

Figure 5:
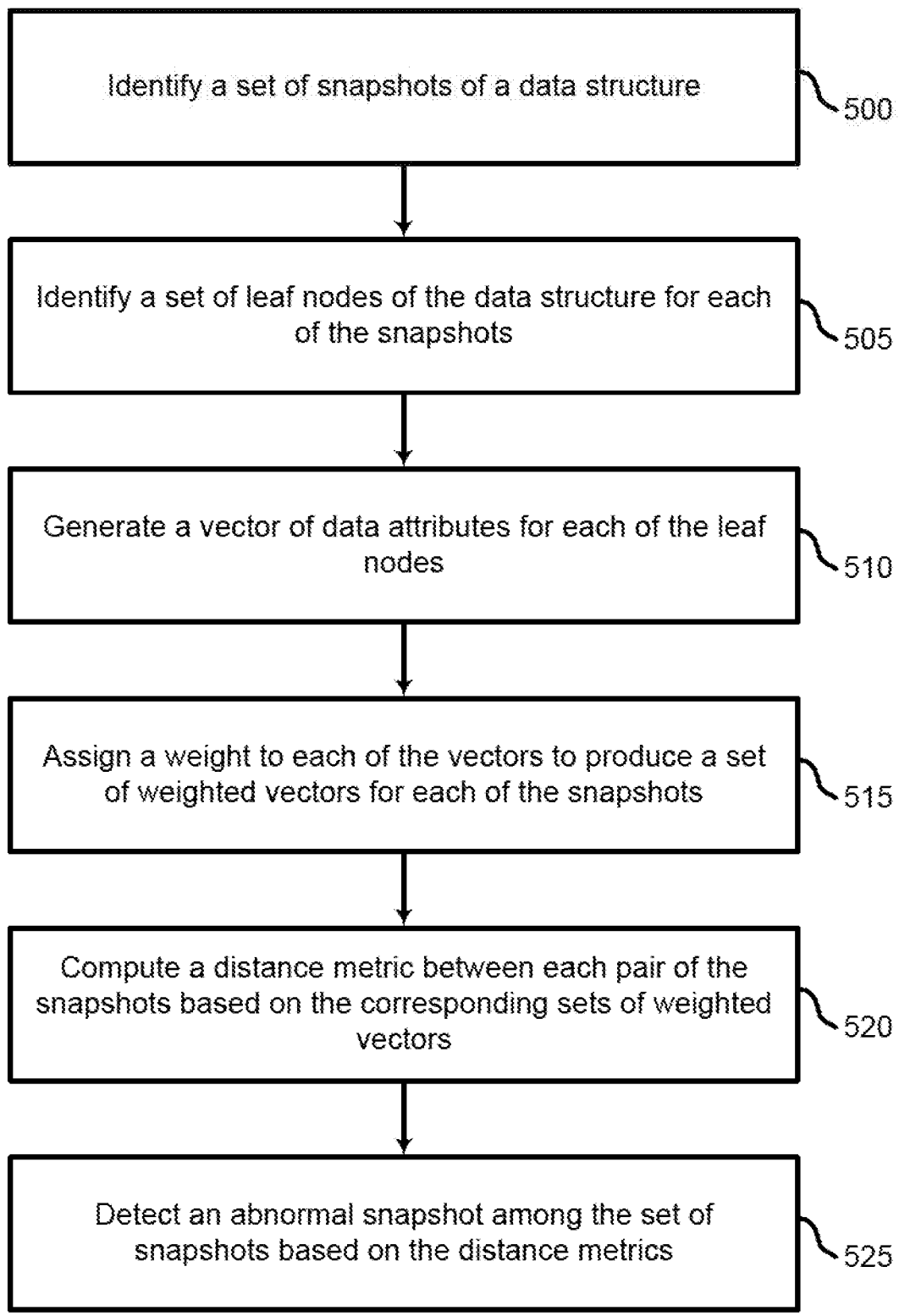
FIGS. 5 through 7 show examples of a process for data breach detection method in which snapshots of backup files are taken and compared to the surrounding files in accordance with aspects of the present disclosure.

FIG. 5 shows an example of a process for data breach detection method in which snapshots of backup files are taken and compared to the surrounding files in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 500, the system identifies a set of snapshots of a data structure. In some cases, the operations of this step may refer to, or be performed by, a snapshot component as described with reference to FIG. 2. Each of the set of snapshots may correspond to a backup of the data structure at a different point in time.

At step 505, the system identifies a set of leaf nodes of the data structure for each of the snapshots. In some cases, the operations of this step may refer to, or be performed by, a data structure component as described with reference to FIG. 2. In some embodiments, the system identifies a tree structure on the data structure, wherein the leaf nodes of the data structure correspond to a bottom level of the tree structure. The tree structure may correspond to a file directory of the data structure.

At step 510, the system generates a vector of data attributes for each of the leaf nodes. In some cases, the operations of this step may refer to, or be performed by, a vector component as described with reference to FIG. 2. Each of the vectors may comprise values corresponding to a path depth attribute, a file size, a file count, a file extension attribute, a file modification attribute, or any combination thereof. In some cases, categorical values may be converted into numerical or binary values (e.g., using one hot encoding).

At step 515, the system assigns a weight to each of the vectors to produce a set of weighted vectors for each of the snapshots. In some cases, the operations of this step may refer to, or be performed by, a weight component as described with reference to FIG. 2. The weight assigned to each of the vectors may correspond to several files associated with a corresponding leaf node. Additionally or alternatively, the weight assigned to each of the vectors may also correspond to a cybersecurity risk associated with a corresponding leaf node.

In some embodiments, the system computes a set of connection weights, wherein each of the connection weights comprises a first index corresponding to a first leaf node of a first snapshot and a second index corresponding to a second leaf node of a second snapshot, wherein a sum of connection weights having the first index is equal to a weight assigned to the first leaf node and a sum of connections weights having the second index is equal to a weight assigned to the second leaf node and a sum of the set of connection weights is equal to one. Additionally, the first leaf node and a vector corresponding to the second leaf node to produce a set of weighted distances, and the system then calculates the distance metric based on a sum of the weighted distances, wherein the set of connection weights is computed to minimize the sum.

At step 520, the system computes a distance metric between each pair of the snapshots based on the corresponding sets of weighted vectors. In some cases, the operations of this step may refer to, or be performed by, a distance component as described with reference to FIG. 2. The distance metric may comprise an earth mover's distance, a Kantorovich-Mallows distance, a Wasserstein distance, or any combination thereof.

At step 525, the system detects an abnormal snapshot among the set of snapshots based on the distance metrics. In some cases, the operations of this step may refer to, or be performed by, a detection component as described with reference to FIG. 2. For example, the system may compute a local reachability density for each of the snapshots based on the computed distance metrics; and determines whether the local density for each of the snapshots is below a threshold based on neighboring snapshots, wherein the abnormal snapshot is identified based on the determination.

Figure 6:
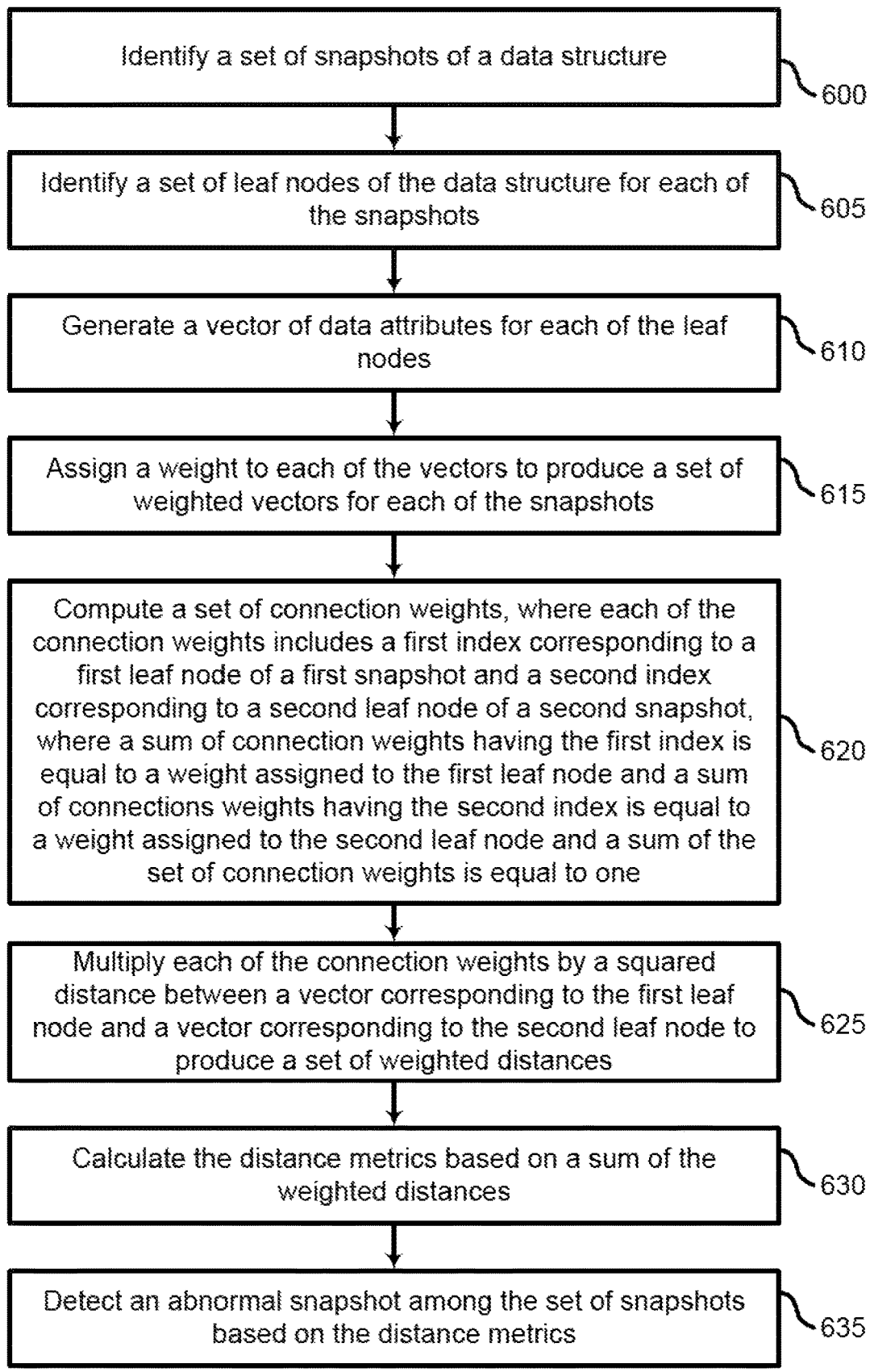

FIG. 6 shows an example of a process for data breach detection method in which snapshots of backup files are taken and compared to the surrounding files in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 600, the system identifies a set of snapshots of a data structure. In some cases, the operations of this step may refer to, or be performed by, a snapshot component as described with reference to FIG. 2. This system provides a method or system for an improved detection of abnormal backup snapshots based on discrete distribution data, which capture statistical distribution of the change in user data.

At step 605, the system identifies a set of leaf nodes of the data structure for each of the snapshots. In some cases, the operations of this step may refer to, or be performed by, a data structure component as described with reference to FIG. 2. For example, in some cases, the system may identify a set of leaf nodes for each snapshot, over a specified time period. In some cases, the system may identify multiple sets of snapshots containing multiple leaf nodes.

At step 610, the system generates a vector of data attributes for each of the leaf nodes. In some cases, the operations of this step may refer to, or be performed by, a vector component as described with reference to FIG. 2. This generates a weighted tree structure consisting of a set of weighted vectors.

At step 615, the system assigns a weight to each of the vectors to produce a set of weighted vectors for each of the snapshots. In some cases, the operations of this step may refer to, or be performed by, a weight component as described with reference to FIG. 2. The node weights can be assigned by the user, as needed.

A variety of methods may be used to determine leaf node weights. In a first example i.e., Type I), several files at each unique file path may be used. This may result in a vector such as [10, 5, 15, 4, 16, 20, 12, 8, 3, 7]. In a second example Type II), the weight may represent a cybersecurity risk value. This may result in a vector such as [0.1, 0.05, 0.15, 0.04, 0.16, 0.2, 0.12, 0.08, 0.03, 0.07]. In some examples, a Type II weighting scheme may result in a normalized set of weights (i.e., where the weights sum to 1).

At step 620, the system computes a set of connection weights, where each of the connection weights includes a first index corresponding to a first leaf node of a first snapshot and a second index corresponding to a second leaf node of a second snapshot, where a sum of connection weights having the first index is equal to a weight assigned to the first leaf node and a sum of connections weights having the second index is equal to a weight assigned to the second leaf node and a sum of the set of connection weights is equal to one. In some cases, the operations of this step may refer to, or be performed by, a distance component as described with reference to FIG. 2.

The first leaf node and a vector corresponding to the second leaf node produces a set of weighted distances and calculates the distance metric based on a sum of the weighted distances, and the set of connection weights may be computed to minimize the sum.

At step 625, the system multiplies each of the connection weights by a squared distance between a vector corresponding to the first leaf node and a vector corresponding to the second leaf node to produce a set of weighted distances. In some cases, the operations of this step may refer to, or be performed by, a distance component as described with reference to FIG. 2.

At step 630, the system calculates the distance metrics based on a sum of the weighted distances, where the set of connection weights is computed to minimize the sum. In some cases, the operations of this step may refer to, or be performed by, a distance component as described with reference to FIG. 2. The distance metric, i.e., Mallow/Wasserstein distance, is calculated using two snapshot signatures; also referred to as two sets of weighted vectors.

At step 635, the system detects an abnormal snapshot among the set of snapshots based on the distance metrics. In some cases, the operations of this step may refer to, or be performed by, a detection component as described with reference to FIG. 2. Abnormal snapshots are detected by comparing a local density of a snapshot with the density of its neighbors.

When the node weights are not normalized (i.e., Type I), the absolute numbers of files under each file path, the distance between two signatures may be defined in terms of an optimal flow described by $F=(\omega_{i,j})$:

$$W(\gamma_1, \gamma_2, F) = \sum_{i=1}^{m_1}\sum_{j=1}^{m_2} \omega_{i,j} \|z_1^{(i)} - z_2^{(j)}\|^2 \quad (1)$$

Which is subject to:

$$\sum_{j=1}^{m_2} \omega_{i,j} \leq q_1^{(i)}, i = 1, \ldots, m_1; \quad (2)$$

$$\sum_{i=1}^{m_1} \omega_{i,j} \leq q_2^{(j)}, j = 1, \ldots, m_2; \quad (3)$$

$$\sum_{i=1}^{m_1}\sum_{j=1}^{m_2} \omega_{i,j} = \min\left(\sum_{i=1}^{m_1} q_1^{(i)}, \sum_{j=1}^{m_2} q_2^{(j)}\right) \quad (4)$$

$$\omega_{i,j} \geq 0, i = 1, \ldots, m_1, j = 1, \ldots, m_2 \quad (5)$$

Once the optimal $w^*_{i,j}$ is found, the squared distance between $\gamma_1$ and $\gamma_2$ is defined as:

$$D^2(\gamma_1, \gamma_2) = \frac{\sum_{i=1}^{m_1}\sum_{j=1}^{m_2} w_{i,j}\|z_1^{(i)} - z_2^{(j)}\|^2}{\sum_{i=1}^{m_1}\sum_{j=1}^{m_2} w_{i,j}} \quad (6)$$

$\gamma_1, \gamma_2$ are the backup snapshot signatures, $z_1^{(i)}$ and $z_2^{(j)}$ are the representing vectors for leaf node i and j, $q_1^{(i)}$ and $q_2^{(j)}$ are the weights, $m_1$ and $m_2$ are the number of leaf nodes. The above distance is referred to as the Earth Mover's Distance (EMD).

When type II is used, the normalized values, which are computed by the number of files in that node divided by the total number of files. The squared distance between $\gamma_1$ and $\gamma_2$ is defined as:

$$D^2(\gamma_1, \gamma_2) = \min_{\{\omega_{i,j}\}} \sum_{i=1}^{m_1}\sum_{j=1}^{m_2} w_{i,j}\|z_1^{(i)} - z_2^{(j)}\|^2 \quad (7)$$

This equation is subject to the constraint:

$$\sum_{j=1}^{m_2} w_{i,j} \leq q_1^{(i)}, i = 1, \ldots, m_1; \quad (8)$$

$$\sum_{i=1}^{m_1} w_{i,j} \leq q_2^{(j)}, j = 1, \ldots, m_2; \quad (9)$$

$$\sum_{i=1}^{m_1}\sum_{j=1}^{m_2} \omega_{i,j} = \sum_{i=1}^{m_1} q_1^{(i)} = \sum_{j=1}^{m_2} q_2^{(j)} = 1 \quad (10)$$

$$\omega_{i,j} \geq 0, i = 1, \ldots, m_1, j = 1, \ldots, m_2 \quad (11)$$

The above distance is referred to as the Kantorovich-Mallows distance. Computing the distance is optimizing matching weights between support vectors in the two distributions such that the aggregated distance is minimized. The matching weights $\omega_{i,j}$ are restricted to be non-negative and the weights emitting from any vector $z_i^{(j)}$ sum up to its probability $q_i^{(j)}$. Thus $q_i^{(j)}$ sets the amount of influence from $z_i^{(j)}$ on the overall distribution distance.

Suppose $D_1^2(\gamma_1, \gamma_2)$ is the mallows distance between signatures $\gamma_1$ and $\gamma_2$ using the percentage of file number as weight, and $D_2^2(\gamma_1, \gamma_2)$ is the mallows distance between signatures $\gamma_1$ and $\gamma_2$ using the percentage of file size as weight, the final distance $\tilde{D}(\gamma_1, \gamma_2) = D_1^2 + D_2^2$.

Figure 7:
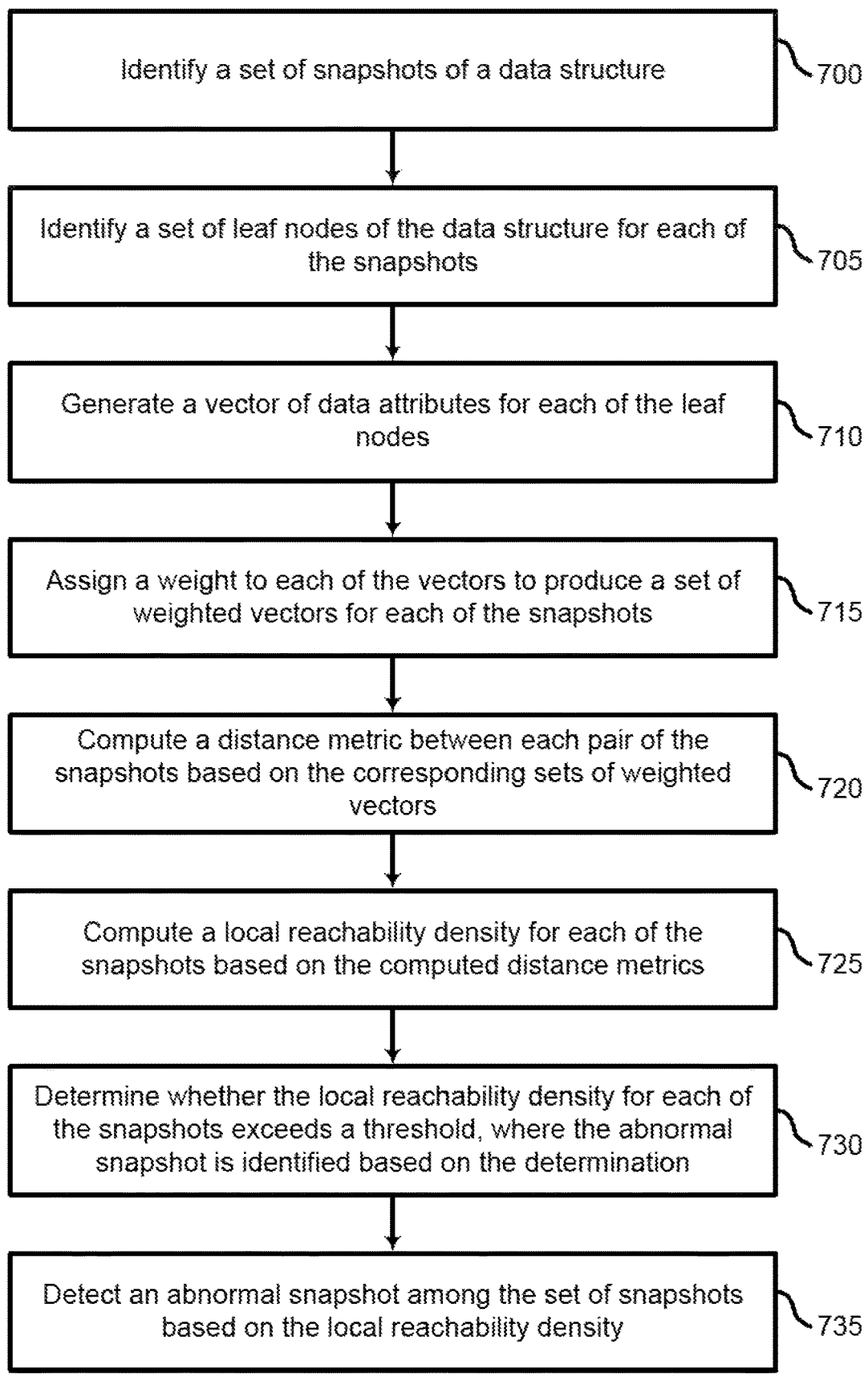

FIG. 7 shows an example of a process for data breach detection method in which snapshots of backup files are taken and compared to the surrounding files in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 700, the system identifies a set of snapshots of a data structure. In some cases, the operations of this step may refer to, or be performed by, a snapshot component as described with reference to FIG. 2.

At step 705, the system identifies a set of leaf nodes of the data structure for each of the snapshots. In some cases, the operations of this step may refer to, or be performed by, a data structure component as described with reference to FIG. 2.

At step 710, the system generates a vector of data attributes for each of the leaf nodes. In some cases, the operations of this step may refer to, or be performed by, a vector component as described with reference to FIG. 2.

At step 715, the system assigns a weight to each of the vectors to produce a set of weighted vectors for each of the snapshots. In some cases, the operations of this step may refer to, or be performed by, a weight component as described with reference to FIG. 2.

At step 720, the system computes a distance metric between each pair of the snapshots based on the corresponding sets of weighted vectors. In some cases, the operations of this step may refer to, or be performed by, a distance component as described with reference to FIG. 2.

At step 725, the system computes a local reachability density for each of the snapshots based on the computed distance metrics. In some cases, the operations of this step may refer to, or be performed by, a detection component as described with reference to FIG. 2.

At step 730, the system determines whether the local reachability density for each of the snapshots comparing with its neighbors is below a threshold, where the abnormal snapshot is identified based on the determination. In some cases, the operations of this step may refer to, or be performed by, a detection component as described with reference to FIG. 2.

At step 735, the system detects an abnormal snapshot among the set of snapshots based on the local reachability density. In some cases, the operations of this step may refer to, or be performed by, a detection component as described with reference to FIG. 2.

The following provides an example algorithm for identifying an anomaly using a local reachability density. The term "distance" refers to the previously defined distance, i.e. $\tilde{D}$. The anomaly detection algorithm is as follows. Let k–distance (A) be the distance snapshot A to the k-th nearest neighbor. Denote the set of k nearest neighbors of A as $N_k(A)$. Define the reachability distance between snapshot A and snapshot B as reachability–distance$_k$ (A, B)=max{k–distance (B), $\tilde{D}(A, B)$}. The local reachability density of a snapshot A is defined by:

$$lrd_k(A) = 1 \Big/ \left( \frac{\sum_{B \in N_k(A)} \text{reachability} - \text{distance}_k(A, B)}{|N_k(A)|} \right), \quad (12)$$

which is the inverse of the average reachability distance of the snapshot A from its neighbors. The local reachability densities are then compared with those of the neighbors using:

$$LOF_k(A) = \frac{\sum_{B \in N_k(A)} lrd(B)}{|N_k(A)|} \Big/ lrd(A), \quad (13)$$

which is the average local reachability density of the neighbors divided by the snapshot's own local reachability density. A value of approximately 1.0 indicates that the signature is comparable to its neighbors, and thus not an outlier. A value below 1.0 indicates a denser region, which can be an inlier, while values significantly larger than 1.0 indicate outliers.

Accordingly, the present disclosure includes the following embodiments.

A method for data breach detection based on snapshot analytics is described. The method may include identifying a plurality of snapshots of a data structure, identifying a plurality of leaf nodes of the data structure for each of the snapshots, generating a vector of data attributes for each of the leaf nodes, assigning a weight to each of the vectors to produce a set of weighted vectors for each of the snapshots, computing a distance metric between each pair of the snapshots based on the corresponding sets of weighted vectors, and detecting an abnormal snapshot among the plurality of snapshots based on the distance metrics.

An apparatus for data breach detection method in which snapshots of backup files are taken and compared to the surrounding files is described. The apparatus may include a processor, memory in electronic communication with the processor, and instructions stored in the memory. The instructions may be operable to cause the processor to identify a plurality of snapshots of a data structure, identify a plurality of leaf nodes of the data structure for each of the snapshots, generate a vector of data attributes for each of the leaf nodes, assign a weight to each of the vectors to produce a set of weighted vectors for each of the snapshots, compute a distance metric between each pair of the snapshots based on the corresponding sets of weighted vectors, and detect an abnormal snapshot among the plurality of snapshots based on the distance metrics.

A non-transitory computer readable medium storing code for data breach detection method in which snapshots of backup files are taken and compared to the surrounding files is described. In some examples, the code comprises instructions executable by a processor to: identify a plurality of snapshots of a data structure, identify a plurality of leaf nodes of the data structure for each of the snapshots, generate a vector of data attributes for each of the leaf nodes, assign a weight to each of the vectors to produce a set of weighted vectors for each of the snapshots, compute a distance metric between each pair of the snapshots based on the corresponding sets of weighted vectors, and detect an abnormal snapshot among the plurality of snapshots based on the distance metrics.

In some examples, each of the plurality of snapshots corresponds to a backup of the data structure at a different point in time. Some examples of the method, apparatus, and non-transitory computer readable medium described above may further include identifying a tree structure on the data structure, wherein the leaf nodes of the data structure correspond to a bottom level of the tree structure.

In some examples, the tree structure corresponds to a file directory of the data structure. In some examples, each of the vectors comprises values corresponding to a path depth attribute, a file size, a file count, a file extension attribute, a file modification attribute, or any combination thereof. In some examples, the weight assigned to each of the vectors corresponds to a number of files associated with a corresponding leaf node. In some examples, the weight assigned to each of the vectors corresponds to a cybersecurity risk associated with a corresponding leaf node.

Some examples of the method, apparatus, and non-transitory computer readable medium described above may further include computing a set of connection weights, wherein each of the connection weights comprises a first index corresponding to a first leaf node of a first snapshot and a second index corresponding to a second leaf node of a second snapshot, wherein a sum of connection weights having the first index is equal to a weight assigned to the first leaf node and a sum of connections weights having the second index is equal to a weight assigned to the second leaf node and a sum of the set of connection weights is equal to one. Some examples may further include multiplying each of the connection weights by a squared distance between a vector corresponding to the first leaf node and a vector corresponding to the second leaf node to produce a set of weighted distances. Some examples may further include calculating the distance metrics based on a sum of the weighted distances, wherein the set of connection weights is computed to minimize the sum. In some examples, the distance metric comprises an earth mover's distance, a Kantorovich-Mallows distance, a Wasserstein distance, or any combination thereof.

Some examples of the method, apparatus, and non-transitory computer readable medium described above may further include computing a local reachability density for each of the snapshots based on the computed distance metrics. Some examples may further include determining whether the local reachability density for each of the snapshots is below a threshold based on neighboring snapshots, wherein the abnormal snapshot is identified based on the determination.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for data breach detection, comprising:
   identifying a first snapshot of a data structure, wherein the first snapshot corresponds to a state of the data structure at a first point in time;
   identifying a plurality of leaf nodes of the data structure based on the first snapshot;
   generating a plurality of vectors corresponding to the plurality of leaf nodes, wherein each of the plurality of vectors represents data attributes of a corresponding leaf node;
   generating a first snapshot signature for the data structure at the first point in time based on the plurality of vectors corresponding to the plurality of leaf nodes;
   computing a set of connection weights, wherein each of the connection weights comprises a first index corresponding to a first leaf node of a first snapshot and a second index corresponding to a second leaf node of a second snapshot, wherein a sum of connection weights having the first index is equal to a weight assigned to the first leaf node and a sum of connections weights having the second index is equal to a weight assigned to the second leaf node and a sum of the set of connection weights is equal to one;
   multiplying each of the connection weights by a squared distance between a vector corresponding to the first leaf node and a vector corresponding to the second leaf node to produce a set of weighted distances;
   computing a distance metric based on a sum of the weighted distances, wherein the set of connection weights is computed to minimize the sum; and
   detecting an abnormal snapshot based on the distance metric.

2. The method of claim 1, further comprising:
   generating a plurality of snapshots based on backup files of data.

3. The method of claim 1, further comprising:
   identifying a tree structure on the data structure, wherein the leaf nodes of the data structure correspond to a bottom level of the tree structure.

4. The method of claim 1, further comprising:
   identifying a tree structure on the data structure, wherein the tree structure corresponds to a file directory of the data structure.

5. The method of claim 1, further comprising:
   assigning a weight to each of the plurality of vectors to produce a set of weighted vectors for each of a plurality of snapshots, wherein each of the plurality of vectors comprises values corresponding to a path depth attribute, a file size, a file count, a file extension attribute, a file modification attribute, or any combination thereof.

6. The method of claim 1, further comprising:
   assigning a weight to each of the plurality of vectors to produce a set of weighted vectors for each of a plurality of snapshots, wherein the weight assigned to each of the plurality of vectors corresponds to a number of files associated with a corresponding leaf node.

7. The method of claim 1, further comprising:
assigning a weight to each of the plurality of vectors to produce a set of weighted vectors for each of a plurality of snapshots, wherein the weight assigned to each of the vectors corresponds to a cybersecurity risk associated with a corresponding leaf node.

8. The method of claim 1, wherein:
the distance metric comprises an earth mover's distance, a Kantorovich-Mallows distance, a Wasserstein distance, or any combination thereof.

9. The method of claim 1, further comprising:
computing a local reachability density for each of a plurality of snapshots based on the computed distance metric; and
determining whether the local reachability density for each of the plurality of the snapshots is below a threshold based on neighboring snapshots, wherein the abnormal snapshot is identified based on the determination.

10. An apparatus for data breach detection method in which snapshots of backup files are taken and compared to surrounding files, comprising:
a processor and a memory storing instructions and in electronic communication with the processor, the processor being configured to execute the instructions to:
identify a plurality of snapshots of a data structure;
identify a plurality of leaf nodes of the data structure for each of the snapshots;
generate a vector of data attributes for each of the leaf nodes;
assign a weight to each of the vectors to produce a set of weighted vectors for each of the snapshots;
compute a set of connection weights, wherein each of the connection weights comprises a first index corresponding to a first leaf node of a first snapshot and a second index corresponding to a second leaf node of a second snapshot, wherein a sum of connection weights having the first index is equal to a weight assigned to the first leaf node and a sum of connections weights having the second index is equal to a weight assigned to the second leaf node and a sum of the set of connection weights is equal to one;
multiply each of the connection weights by a squared distance between a vector corresponding to the first leaf node and a vector corresponding to the second leaf node to produce a set of weighted distances;
calculate a distance metric between each pair of the snapshots based on a sum of a set of weighted distances corresponding to the pair of snapshots, wherein the set of connection weights is computed to minimize the sum; and
detect an abnormal snapshot among the plurality of snapshots based on the calculated distance metric.

11. The apparatus of claim 10 the processor being further configured to execute the instructions to:
identify a tree structure on the data structure, wherein the leaf nodes of the data structure correspond to a bottom level of the tree structure.

12. The apparatus of claim 10, the processor being further configured to execute the instructions to:
compute a local reachability density for each of the snapshots based on the calculated distance metric; and
determine whether the local reachability density for each of the snapshots is below a threshold based on neighboring snapshots, wherein the abnormal snapshot is identified based on the determination.

13. A non-transitory computer readable medium storing code for data breach detection in which snapshots of backup files are taken and compared to surrounding files, the code comprising instructions executable by a processor to:
identify a first snapshot of a data structure, wherein the first snapshot corresponds to a state of the data structure at a first point in time;
identify a plurality of leaf nodes of the data structure based on the first snapshot;
generate a plurality of vectors corresponding to the plurality of leaf nodes, wherein each of the plurality of vectors represents data attributes of a corresponding leaf node;
compute a set of connection weights, wherein each of the connection weights comprises a first index corresponding to a first leaf node of a first snapshot and a second index corresponding to a second leaf node of a second snapshot, wherein a sum of connection weights having the first index is equal to a weight assigned to the first leaf node and a sum of connections weights having the second index is equal to a weight assigned to the second leaf node and a sum of the set of connection weights is equal to one;
multiply each of the connection weights by a squared distance between a vector corresponding to the first leaf node and a vector corresponding to the second leaf node to produce a set of weighted distances;
compute a distance metric based on a sum of the weighted distances, wherein the set of connection weights is computed to minimize the sum;
and
detect an abnormal snapshot based on the distance metric.

14. The non-transitory computer readable medium of claim 13, the code further comprising instructions executable by a processor to:
generate the first snapshot based on a backup of the data structure.

15. The non-transitory computer readable medium of claim 13, the code further comprising instructions executable by the processor to:
identify a tree structure on the data structure, wherein the leaf nodes of the data structure correspond to a bottom level of the tree structure.

16. The non-transitory computer readable medium of claim 13, the code further comprising instructions executable by the processor to:
compute a local reachability density for each of a plurality of snapshots based on the computed distance metric; and
determine whether the local reachability density for each of the plurality of snapshots is below a threshold based on neighboring snapshots, wherein the abnormal snapshot is identified based on the determination.

* * * * *